Sept. 20, 1932.  E. HAMWI  1,878,395

PASTRY CUP

Filed Aug. 26, 1929

Inventor:
Ernest Hamwi,
by Rippey & Kingsland.
His Attorneys.

Patented Sept. 20, 1932

1,878,395

UNITED STATES PATENT OFFICE

ERNEST HAMWI, OF ST. LOUIS, MISSOURI

PASTRY CUP

Application filed August 26, 1929. Serial No. 388,370.

This invention relates to a new and useful pastry cup and an object is to provide a frangible and friable pastry cup having means in connection with the side wall thereof for supporting the cup in the relationship in which the bottom of the cup is above and out of contact with the article on which the cup is placed.

Another object of the invention is to provide an improved friable and edible pastry cup for containing pastry and other articles of food, which includes a wall which is comparatively thin radially and which includes an integral reinforcing portion around its upper marginal edge and which has at its lower end an elongation of the wall supporting the bottom of the cup above the lower end of said elongation.

Another object of the invention is to provide an improved cup for containing articles of food and which is composed of a thin edible, friable wall provided with reinforcing thickened portions about its upper end and for supporting the bottom of the cup respectively, and which are arranged in the desired relationship to longitudinal ornamenting reinforcing ribs or flanges on the exterior surface of the wall.

Various other objects and advantages of my improved cup will be apparent from the following description, reference being made to the accompanying drawing, in which Fig. 1 is a perspective view looking into the upper end of an appropriate form of the invention.

Figure 1:
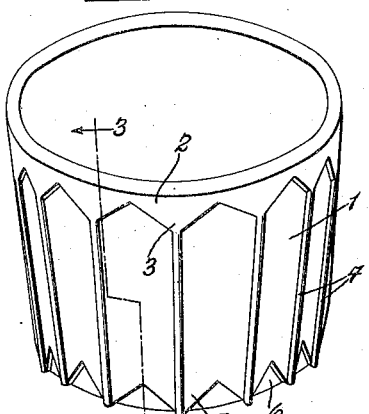
Figure 2:
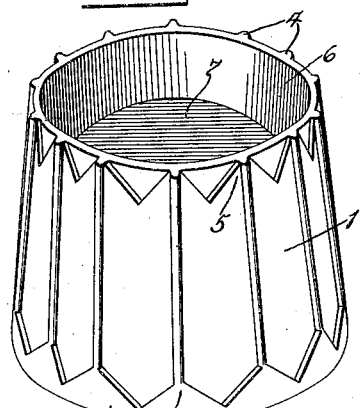
Fig. 2 is a perspective view looking into the bottom end of the cup.
Figure 3:
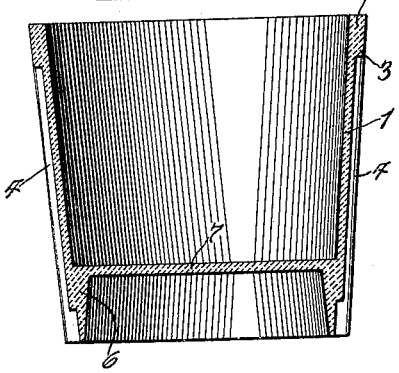
Fig. 3 is a vertical transverse sectional view of the cup.

The cup shown in Figs. 1, 2 and 3 is composed of edible, friable farinaceous substance and comprises a downwardly tapered wall 1. This wall 1 is quite thin and it may need to be strengthened at its ends. The present invention comprises means for strengthening the ends of the wall of the cup and also ornamenting the cup. To this end, I form integral with the upper marginal portion of the wall 1 a scalloped thickened portion 2 obtained by thickening the material of which the wall is formed. I say that the thickened portion 2 is scalloped because in the configuration shown there are upwardly pointed notches in the lower edge of the thickened portion. Thus, between the notches there are downwardly rounded thickened portions 3 formed integral with the marginal portion 2 around the upper margins of the cup. From the points in each pointed portion 3 a rib 4 is formed integral with the outer surface of the cup. These ribs 4 extend to the lower end of the wall of the cup, terminating at the downwardly extended points of the pointed portions 5 formed at the lower end of the wall 1 and separated by upwardly pointed notches, as shown. The points 5 are thus formed in alinement with the points 3 and the notches separating the points 5 are in alinement with the notches separating the points 3, so that symmetrical configuration is obtained.

The inside of the wall 1, at its lower end, is formed with an integral thickened portion 6 which extends across the notches between the pointed portions 5 and forms an integral connection between said pointed portions. The thickened portion 6 extends well above the upper points of the notches which separate the pointed portions 5 and extend inwardly well beyond the inner surface of the wall 1. A bottom wall 7 is formed integral with the wall 1 and with the thickened portion 6, so that the union of the wall 7 with the wall 1 is thus strengthened and reinforced.

Figure 4:
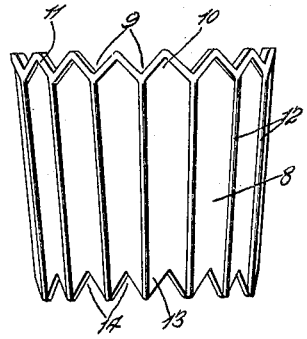
Fig. 4 is a side elevation of a cup of an alternative form.

In the variation of the invention shown in Figs. 3 and 4, the downwardly tapered wall 8 is composed of thin friable, farinaceous material and has its upper edge formed with downwardly pointed notches 9, thus producing upwardly pointed portions 10 between said notches. The marginal edge of the pointed portions 10 is strengthened and reinforced by a thickened marginal portion 11 formed integral with the wall 8 and functions both as a strengthening and reinforcing device and as an ornamenting border. From the downwardly extended points of the thickened portions 11, ribs 12 are formed integral with the wall 8 and extend to the lower end of said wall terminating at the lower points of downwardly pointed portions 13 of the walls 8 obtained by forming in the lower ends of said wall 8 upwardly pointed notches 14. Above the notches 13 a bottom wall 15 is formed integral with the wall 8, and the portion of said wall 8 below the wall 15 may be the same thickness as the wall 8 above said bottom.

Figure 5:
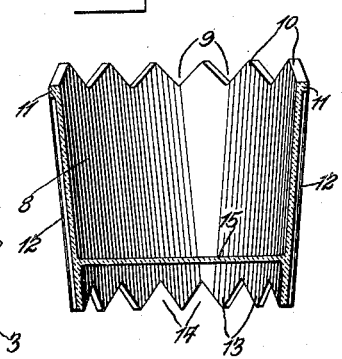
Fig. 5 is a vertical cross sectional view of the cup shown in Fig. 4.

From the foregoing, it is apparent that my invention obtains all of its intended objects quite satisfactorily. The wall proper of the cup being of thin friable material may need strengthening and reinforcing, particularly about the upper end of said wall in order that the cups may be telescoped one within the other for storage and transportation. To this end, the cup shown in Figs. 1, 2 and 3 is provided with the marginal reinforcements 2, and the cup shown in Figs. 4 and 5 is provided with the marginal reinforcements 11. Both reinforcements have downwardly pointed portions from which strengthening and ornamenting ribs extend to the lower end of the thin friable wall of the cup. Thus, in the device of Figs. 1, 2 and 3, the ribs 4 extend from the points of the downwardly pointed portions 3 to the points of the downwardly pointed portions 5; and in the cup of Figs. 4 and 5, the ribs 12 extend from the points of the downwardly pointed reinforcement 11 to the points of the downwardly pointed portions 13 at the lower end of the cup. These ribs 4 and 12 obtain the proper strength so that the thin friable walls will not become broken or demolished when telescoped, one within the other, for storage or transportation.

The specific arrangement and formation of the structure of my improved edible cup may be varied otherwise and within equivalent limits without departure from the nature and principle of the invention. So, too, while I have mentioned the cup as useful as a pastry cup, it is clear enough that it may be applied to other uses with equal satisfaction.

I do not restrict myself in these or other unessential respects, but what I claim and desire to secure by letters patent is:—

1. An edible cup composed of friable, farinaceous material and comprising a thin downwardly tapered wall, downwardly extended portions at the lower end of said wall separated by intervening notches, a strengthening thickened re-enforcement formed integral with the outer surface of said wall around the upper margin thereof, a strengthening thickened re-enforcement formed integral with the inside of the lower end of said wall above said downwardly extended portions and extending across said notches between and integrally connecting said downwardly extended portions, ribs formed integral with the outer surface of said wall and extending from said first named re-enforcement downwardly to the lower ends of said downwardly extended portions, and a bottom wall for the cup formed integral with said wall and with said second strengthening re-enforcement above said downwardly extended portions, all of said parts of said cup being formed in a unitary structure.

2. An edible cup composed of friable farinaceous material and comprising a thin downwardly tapered wall, having notches in its lower end, downwardly extended portions between said notches at the lower end of said wall, a thickened portion integral with the outside of the upper end of the cup, a thickened portion integral with the inside of the lower end of the cup above said notches, a bottom wall formed integral with the wall of the cup above said notches and above said last named thickened portion, and ribs integral with the outer side of the wall of the cup extending from said first named portion to the lower ends of said downwardly extended portions between said notches and crossing the plane of the connection of said bottom wall with the said first named wall.

ERNEST HAMWI.